May 18, 1954     V. SPENCER     2,678,464
CALENDER
Filed June 13, 1950
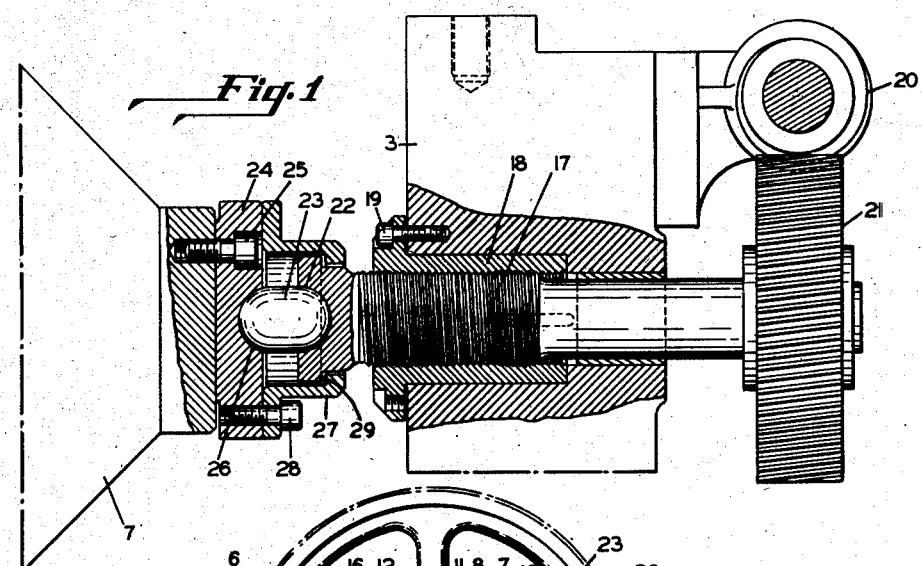
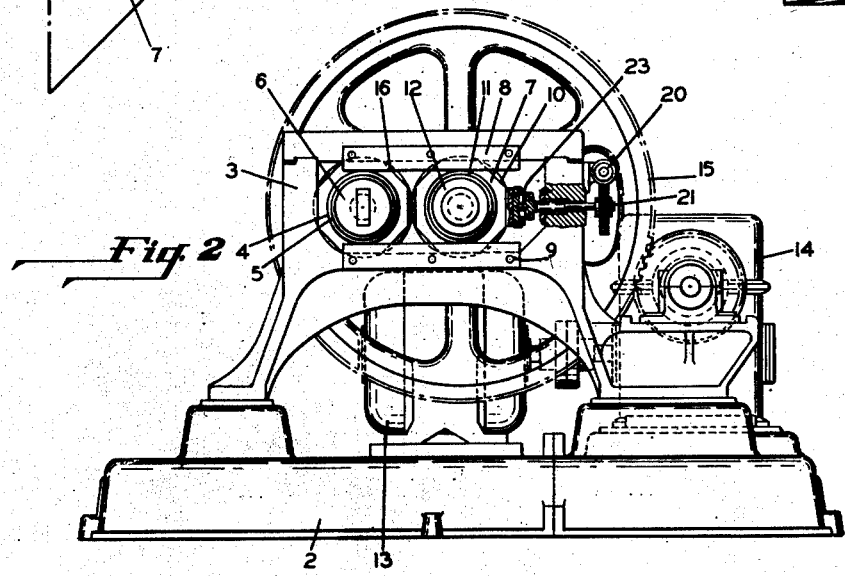
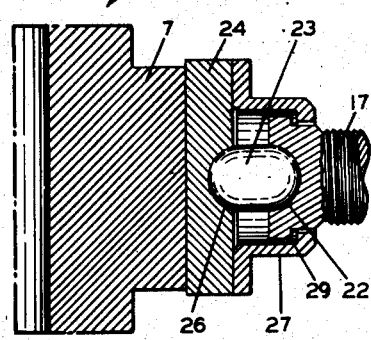
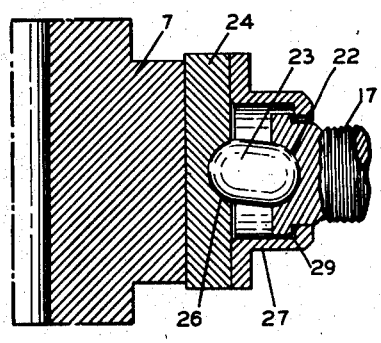
Inventor
VIRGIL SPENCER
by Walter F. Kaufman
Attorney

Patented May 18, 1954

2,678,464

UNITED STATES PATENT OFFICE 2,678,464

CALENDER

Virgil Spencer, East Petersburg, Pa., assignor to Armstrong Cork Company, Lancaster, Pa., a corporation of Pennsylvania Application June 13, 1950, Serial No. 167,783

1 Claim. (Cl. 18—2)

This invention relates to an improvement in calenders, mills, or the like and more particularly to an adjusting screw mechanism to permit proper alignment of the roll bearings while one of the rolls is being moved during roll adjustment as in control of the gauge of sheet material being processed on the mill.

In the operation of calenders or mills of the type currently used in the manufacture of sheet material such as linoleum and the like, it has been common practice to provide one roll with bearings mounted in fixed chocks so that its position will always be the same and to provide the other roll with bearings mounted in movable chocks so that the position of the movable roll can be adjusted with respect to the fixed roll to alter the distance between the two rolls in accordance with the requirements for the particular sheet material being processed.

The movable chocks used prior to this invention were adjusted by means of an adjusting screw mechanism having a convex end which was machined to fit into a suitably machined concave socket on the side of the chock, forming a partial ball and socket joint between the adjusting screw and the chock. The reason for the ball and socket joint is to permit the chock to pivot slightly with respect to the adjusting screw so that the bearing carried by the chock will automatically align itself with the shaft of the mill or calender roll. If this limited pivotal movement is not permitted, any slight adjustment of the roll will tend to twist the bearings, causing the shaft to bind therein.

Because of the nature of the heavy equipment used in the processing of raw materials used in the manufacture of sheet material such as linoleum and the like, it is necessary that the bearing chocks for the movable roll be free not only for pivotal movement but must also be free to move in a direction parallel to the axis of the calender roll. This lateral movement is limited to approximately ⅛"; but nevertheless, it is sufficient to permit the chock to move to such an extent that the center line of the socket in the chock does not always coincide with the center line of the ball portion of the adjusting screw. When this off-center condition exists, the ball and socket joint of the type used heretofore does not function properly because the pressure on one side of the ball and socket joint is greater than on the other side, causing the same to bind. This binding prevents the chock from pivoting when an adjustment is made with the result that the bearings are cocked, causing undue wear. It should be borne in mind that in equipment of the type here under consideration the pressure on the ball and socket joint may be in the neighborhood of 200 tons.

In order to overcome the disadvantages experienced in the prior art structures, the present structure has been developed. This new device provides two ball and socket joints between the adjusting screw and the chock, each joint being provided with a hemispherical ball and a hemispherical socket, which arrangement provides greater flexibility in the device, making it possible for the chock to move pivotally and laterally with respect to the screw and yet maintain complete contact between the balls and sockets to carry the high loads.

An object of this invention is to provide a freely working joint between a bearing chock and an adjusting mechanism.

In order that this invention may be more readily understood, the same will be described in connection with the attached drawing in which:

Figure 1 is a cross-sectional view of the chock adjusting mechanism showing the joint;

Figure 2 is an elevational view of a machine showing the position of the adjusting mechanism with respect to the position of the rolls;

Figure 3 is a cross-sectional view looking down on the top of the adjusting mechanism with the chock and the adjusting screw in alignment; and Figure 4 is a cross-sectional view looking down on the top of the adjusting mechanism with the chock moved out of alignment with the adjusting screw.

Referring to Figure 2 there is shown a conventional two-roll calender mounted on a base 2 by means of a calender frame 3. Mounted on the calender frame 3 is a stationary chock 4 having a bearing 5 in which a calender roll journal 6 rotates. Adjacent to the stationary chock 4 is a horizontally slidable chock 7 mounted for horizontal movement within ways 8 and 9. The positioning of the chock 7 in the ways 8 and 9 is such that the chock is free to move a limited amount (approximately ⅛") in a direction parallel to the longitudinal axis of the roll 10. This movable chock carries a bearing 11 fixed therein in which the roll journal 12 of the movable roll 10 rotates. The calender rolls are driven by motor 13 through a suitable gear reduction device 14 and the large drive gear 15. This drive gear 15 drives both calender rolls through a suitable gearing mechanism not shown.

In order to adjust the clearance between the rolls 10 and 16, the roll 10 is mounted in the movable bearing chock 7. Referring to Figure 1 there is shown an adjusting screw 17 threaded in a sleeve 18 which is in turn secured in a portion of the calender frame 3. This threaded sleeve 18 is removable and is held in place by means of studs 19. The screw 17 is rotated by means of a worm 20 which is in engagement with worm gear 21 keyed to the end of the screw shaft 17. The opposite end of the screw shaft 17 is provided with a socket 22 adapted to receive the end of a rod 23 having rounded ends. The chock 7 is provided with a bearing plate 24 which is secured to the side thereof by means of studs 25. This bearing plate 24 has a socket 26 which is designed to receive the other end of the rod 23.

Attached to the bearing plate 24 and encircling the rod 23 is a flanged ring 27 held in place on bearing plate 24 by means of studs 28. The flange on the flanged ring 27 extends over a flange 29 on the end of the screw shaft 17. This prevents the chock 7 from moving away from the adjusting screw 17 and also provides means whereby the movable roll may be moved away from the fixed roll while making adjustment. However, the fit between the flange of the ring 27 and the flange 29 is sufficiently loose to enable the two members to twist slightly with respect to one another.

The rod 23 provides two ball and socket joints between the adjusting screw and the chock. The radius on the ends of the rod 23 provides bearing surfaces for carrying the pressure exerted thereon. The bearing surfaces of the end of the screw 17 and the end of the rod 23 are complementary, and the bearing surface on the plate 24 is complementary with the other ball end of the rod 23. This arrangement permits the bearing chock 7 to be free to align its bearing 11 with the roll journal 12 while the adjustment is being made even though the center line of the socket in the chock 7 may not be the same as the center line of the adjusting screw 17, and the longitudinal axis of the roll may not be perpendicular to the center line of the screw. This off-center condition is illustrated in Figure 4. Figure 3 is a view looking down on the roll adjusting mechanism when the chock and adjusting screw are in alignment, and Figure 4 is a similar view showing the chock and adjusting screw out of alignment. It will be obvious from a study of Figure 4 that the rod 23 is effective for transmitting force from the adjusting screw to the chock even though they are out of alignment.

The geometrical shape of the rod 23 shown herein is preferable in carrying out the invention. A sphere permits the chock to pivot, but it does not permit the chock to move in a direction parallel to the longitudinal axis of the calender roll. With a rod member 23 as shown, there are provided two ball and socket joints whereby the chock is free to move in any direction while at the same time it is connected to the adjusting screw 17 in such manner that the adjusting screw is effective for moving the movable roll toward and away from the fixed roll to control the gauge of the sheet material being processed thereon.

This invention has been found highly advantageous in maintaining proper adjustment of rolls on heavy manufacturing equipment such as that used in the processing of sheet material.

It will be understood that the terms "calender" and "mill" refer to any arrangement of rolls in which one roll is adjustable with respect to the others.

I claim:

In a mechanism for adjusting the clearance between the rolls of a calender, the elements comprising a calender frame, a pair of calender rolls mounted in said frame, one of said rolls being adjustable with respect to the other roll, said adjustable roll being journalled in chocks slidably mounted in said calender frame, each of said chocks being provided with a hemispherical socket, the central axis of which is normal to the longitudinal axis of the journal, a holddown adjusting screw threadably mounted in said calender frame, the central axis of the adjusting screw being substantially normal to the longitudinal central axis of the calender roll journal, the end of the adjusting screw disposed in the vicinity of the chock being provided with a hemispherical socket, and a rod having hemispherical ends disposed between the adjusting screw and the chock with the hemispherical ends of the rod fitting in the respective sockets in the chock and the adjusting screw.

References Cited in the file of this patent

UNITED STATES PATENTS

| Number | Name | Date |
|---|---|---|
| 381,746 | Wright | Apr. 24, 1888 |
| 901,251 | McIlvried | Oct. 13, 1908 |
| 1,500,679 | Midgley | July 8, 1924 |
| 1,741,715 | Hugues | Dec. 31, 1929 |
| 1,762,292 | George | June 10, 1930 |
| 1,871,137 | Underdahl | Aug. 9, 1932 |
| 2,010,211 | Wood | Aug. 6, 1935 |
| 2,069,746 | Andrews | Feb. 9, 1937 |
| 2,078,777 | Schade | Apr. 27, 1937 |

FOREIGN PATENTS

| Number | Country | Date |
|---|---|---|
| 243,344 | Great Britain | Apr. 29, 1926 |